May 10, 1932.  H. H. TUNSTALL  1,858,175
MACHINE FOR APPLYING A LAYER OF PLASTIC MATERIAL
TO ARTICLES, SUCH AS BISCUITS
Filed May 12, 1930    3 Sheets-Sheet 1

INVENTOR
H. H. Tunstall
BY
Sturtevant, Mason & Porter
ATTORNEYS

May 10, 1932. H. H. TUNSTALL 1,858,175
MACHINE FOR APPLYING A LAYER OF PLASTIC MATERIAL
TO ARTICLES, SUCH AS BISCUITS
Filed May 12, 1930 3 Sheets-Sheet 2

INVENTOR
H. H. Tunstall
BY
Sturtevant, Mason & Porter
ATTORNEYS

Inventor:
Harold H. Tunstall,
Attorneys.

Patented May 10, 1932

1,858,175

UNITED STATES PATENT OFFICE

HAROLD HARDMAN TUNSTALL, OF LIVERPOOL, ENGLAND, ASSIGNOR OF ONE-HALF TO T. & T. VICARS LIMITED, OF EARLESTOWN, ENGLAND, A BRITISH COMPANY

MACHINE FOR APPLYING A LAYER OF PLASTIC MATERIAL TO ARTICLES, SUCH AS BISCUITS

Application filed May 12, 1930, Serial No. 451,822, and in Great Britain June 8, 1929.

The present invention relates to an improved machine for applying a layer of plastic material to biscuits, such for instance, as for applying a layer of cream or icing to a biscuit and further to forming what is known as sandwich biscuits.

Biscuits of the type that it is usual to sandwich are generally of a friable nature and have little structural strength, therefore the fewer handling operations and the more gentle these operations are, the less liability there is of breakage. Owing to the fact that the dough from which the biscuits are made is of a soft consistency, it is readily understandable that there is a considerable number of minor differences in the shapes of the finished biscuits. This being the case, it is desirable that the holding mechanism for the biscuits during the various operations shall be of a yielding nature which will allow considerable latitude in the thickness and shape of the biscuits.

In some known types of biscuit creaming and sandwiching machines it is customary to extract the biscuits from a hopper by means of a reciprocating slide. The motion of the slide tends to agitate the stack of biscuits. It also requires the biscuits to drop suddenly into a position whereby the other biscuits in the stack are disturbed. This continual agitating of the biscuits is not a desirable feature if breakages are to be eliminated.

The object of the present invention, therefore, is to provide a continuously moving extractor to enable a gradual lowering of the biscuit before it is taken out of the hopper, whereby a smooth transfer action takes place and undue shaking of the biscuit and its disturbance and breakage is prevented.

According to the present invention the biscuits are taken out of a hopper by means of a drum having a pocketed or ported periphery, the said biscuits passing directly from the hopper into the pockets of the drum.

From another aspect of the invention a drum having a plurality of pockets of ratchet tooth form with their leading edges flush with the periphery of the drum, is adapted to rotate beneath a hopper to take up a supply of biscuits therefrom.

Each of the pockets has an internal stencil slot or passage adapted to communicate with a hopper feeding icing, cream or the like material to the biscuits, during a portion of the travel of the pockets in making one complete revolution with the drum. The biscuits, after having received a layer of cream icing, or the like, may then have a second biscuit applied to them and/or may be conveyed through a drying apparatus. The second biscuit where desired, can be applied by any desired known method, or alternatively by a second pocketed cylinder, or roller somewhat similar in construction to the first, but if necessary of solid form.

The second biscuit, for convenience, will hereinafter be referred to as a sandwich biscuit by virtue of the fact that it completes the sandwich when applied to a biscuit already creamed.

In one preferred form of construction according to the present invention, a hollow cylinder is provided with a number of substantially ratchet tooth pockets on its periphery, which are each terminated by a radial flange or edge. The cylinder is adapted to rotate in intimate relation with a hopper or chute adapted to receive a stack of biscuits, so that as each of the said pockets with its radial edge at the rear comes opposite the stack a biscuit will drop into it and be conveyed round by it. It is preferred to provide a cylindrical guide for the biscuits taken up within these pockets after they have been taken up from the stack to prevent them falling away from the said drum or cylinder too soon.

At the base of each of these pockets, one or more slots are provided in the form of a stencil plate or opening of any desired shape or contour, so that cream or the like from a hopper, formed within or by the drum itself, the mouth of which hopper is closed by the inner surface of the rotating hollow cylinder, can pass therethrough and on to the biscuit, while the latter is travelling with the drum. The cream hopper may have, though not necessarily so, a yielding side which will conform to the internal surface of the drum which may be other than truly circular.

Means for temporarily filling up the stencil opening in the drum while the biscuit is being transferred from the storage hopper to the pocket are preferably provided and this may be accomplished by providing a yielding surface attached to a stationary part of the apparatus which can fill up the opening for the short distance of the drum's travel past the hopper mouth and which can move out of the way after the biscuit is in position.

The invention also includes the provision of stripping means for removing the biscuit positively with its cream layer. The biscuit can then be further conveyed to any desired remote point, which may be the drying apparatus referred to and if a second biscuit is to be applied to the cream biscuit then the conveyer will extend beneath a second pocketed cylinder or drum.

Where the guide means are in the form of a flexible web or band partially surrounding the cylinder or drum, this band or web may itself form the conveyer for conveying the biscuits to the remote point and is preferably endless.

The web or band preferably leaves the surface of the drum at a tangent whilst it is desirable that the biscuits shall come away from the drum and be carried in a regular position on the web, an extractor may be employed which will positively detach the biscuit and the cream filling from the drum.

During this traverse, the second biscuit may be applied to the surface of the cream application on the first biscuit.

For placing the additional biscuit on to the cream so as to form a sandwich, a similar means to that already described may be used for extracting a biscuit from a stack, but in this case the biscuit instead of being carried forward by its own guide or conveyer band, may be led on to an inclined plate from which plate it may be deposited on to the creamed biscuit passing underneath on the band or web which forms the guide passing partially around the first drum. In this case the drum is solid and the stack is situated above the drum. Preferably, however, the biscuit hopper is situated inside a hollow extractor drum, and the pockets for extracting the biscuits are inside. The bottom of the pocket is perforated to allow the biscuit to pass through. The biscuits are retained in the pockets by means of a plate, which may either be stationary or have a reciprocating movement to quickly deposit a biscuit and which is curved to conform with the outside of the drum and further which is positioned adjacent to the drum. The biscuits in the pocket move in a circular direction for a short distance whilst being supported by the plate but at the termination of the plate the biscuits drop out of the pocket on to a conveyer band passing underneath or on to an already creamed biscuit.

The invention is more particularly described with reference to the accompanying drawings, in which:—

Figure 2:
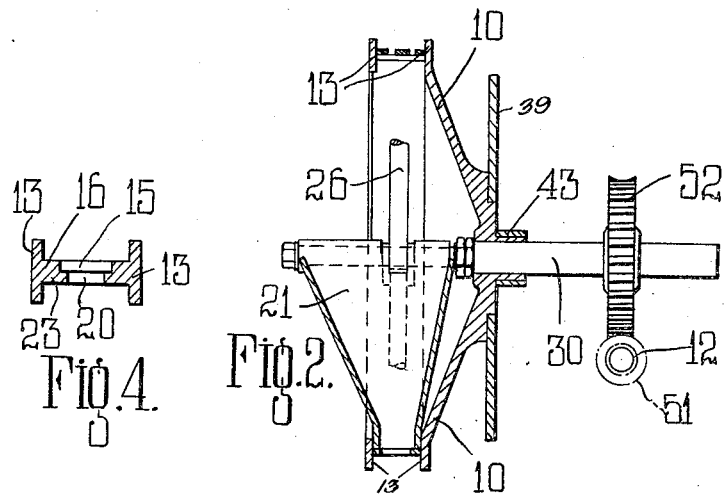
Figure 2 is a section along the line 2—2 of Figure 1.
Figure 3:
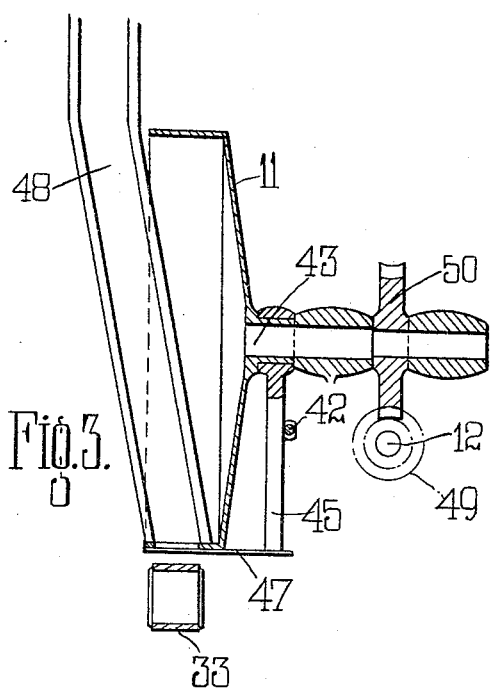
Figure 3 is a section along the line 3—3 of Figure 1.
Figure 5:
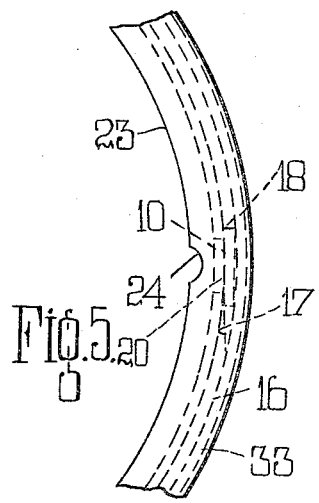
Figure 5 is an enlarged view of a portion of the periphery of the stencil drum, showing in detail, the circumferential configuration of one of the pockets on the drum.
Figure 6:
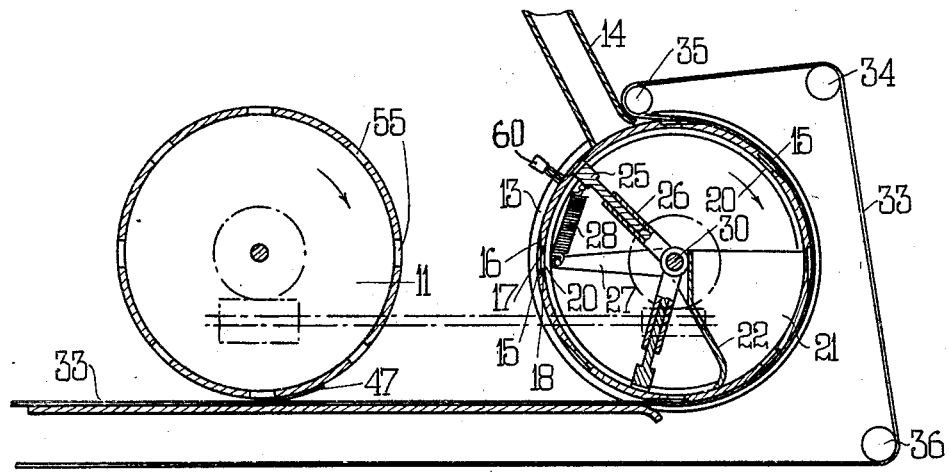
Figure 6 is a sectional view through the drums.

In the drawings a pair of drums 10, 11, are rotated from a common driving shaft 12 so that the drums rotate in synchronism. The drum 10, on its periphery, has radially and outwardly disposed flanges 13 (Fig. 2) between which, at pre-determined intervals, biscuits are adapted to be fed from a hopper 14. The periphery of the drum 10 is provided with a number of pockets 15 (Fig. 6) at intervals along its circumference. The leading edge 17 of these pockets merges gradually into the peripheral surface 16 of the drum whilst a rear face 18 of the pockets extends substantially radially of the drum, the base of the pockets 19 being flat or uniplanar. Each of the pockets has a stencil opening 20 leading therefrom to the interior of the drum.

A hopper 21 adapted to contain cream, icing or the like plastic material, is mounted with its exit end formed by an arc of a circle situated in proximity to the path of travel of the internal periphery of the drum.

A wall 22 of this creaming hopper is yieldable if desired.

The inner periphery 23 of the drum has a number of recesses 24 formed therein in radial relationship with the pockets 15. These recesses 24 are adapted to receive a head 25 slidable against spring action on an arm 26 disposed radially of the drum, said arm being connected with a rigid arm 27 by means of a spring 28. A spring 29 tends to force the head 25 of the arm 26 away from the axis of rotation 30 of the drum, the head 25 for this purpose being carried on the telescopic member within the arm 26.

The function of this arm 26 is to prevent the edges of the biscuits fed from the hopper 14 from catching in the edges of the stencil opening 20 in the drum when such biscuits are taking up their position in the pockets 15. During feeding of the biscuits, the head 25 engages in one of the recesses 24 and fills up the stencil opening 20. The arm 26 thus rotates for a short time with the drum until it is engaged by a stationary trip mechanism 31 which forces the head 25 out of engagement with the recess 24 whereupon the arm 26 is retreated to its initial position under the action of the spring 28 and reengages in the next succeeding recess 24 of the drum for assisting in the feeding of the next biscuit into the next succeeding pocket.

A stripping device 32 is provided for ejecting creamed biscuits from the pockets 15 after such pockets have passed the creaming hopper 21 and when the biscuits are in the position ready to be conveyed to a further biscuit loading device or to a stacking and packing mechanism. The position of this stripping or biscuit ejecting device 32 is adjusted by manually operated means 38.

A flexible band, belt or the like 33 is adapted to pass around rollers 34, 35, 36 and to directly engage with the outer surface 16 of the drum to retain the biscuits in position in the pockets 15.

In the construction illustrated this flexible band 33 is endless and constitutes the means for conveying the biscuit to the sandwiching drum 11 and if desired also to the stacking and packing mechanisms (not shown). For this purpose the endless band passes round a further roller 37.

Figure 1:
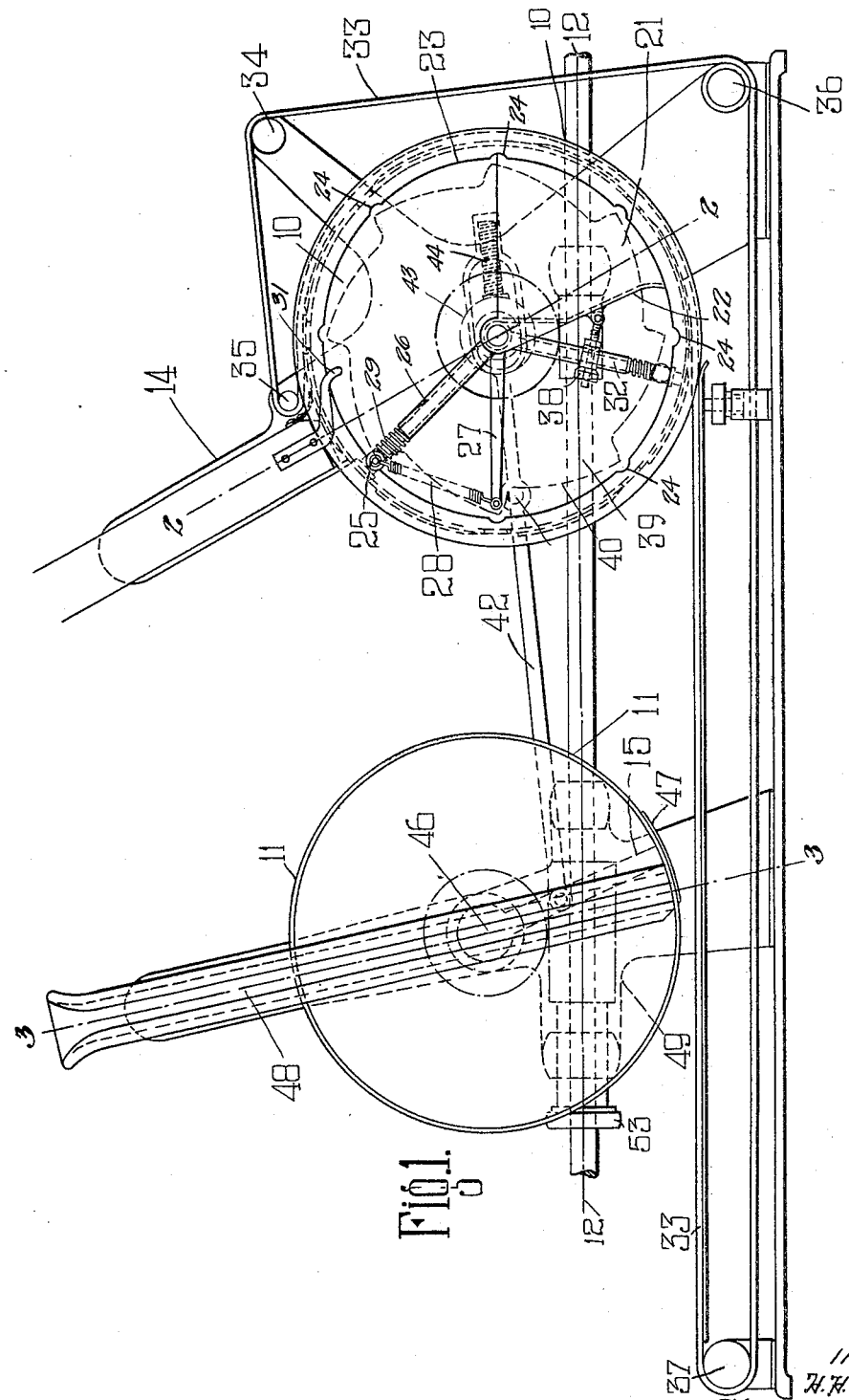
Figure 1 is a view in elevation of a machine constructed according to the present invention.
Figure 4:
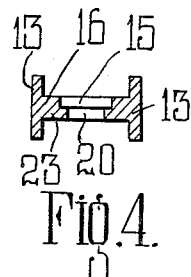
Figure 4 is a detail showing a section through the periphery of the stencil drum, illustrated at the right hand side of Figure 1.
Figure 7:
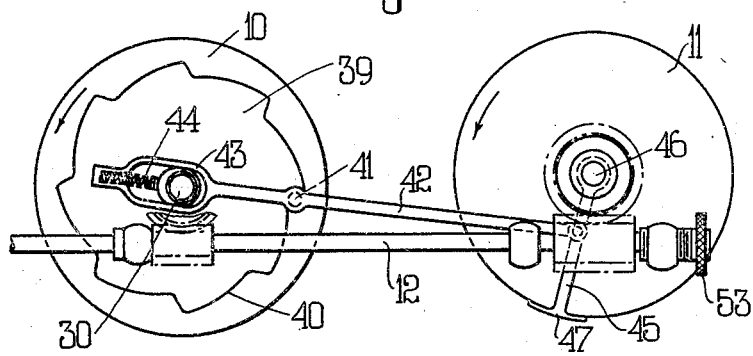
Figure 7 is a view elevation of the reverse side of the machine to that illustrated in Figure 1 showing the driving shaft connections for the drums and the operating device for the plate of the sandwich drum.

A disc 39 (Figs. 1, 2 and 7) having a plurality of cam surfaces 40 formed thereon rotates with the drum 10 and in its rotation displaces a roller 41 mounted on a connecting rod 42. One end of this connecting rod terminates a yoke 43 which carries a spring 44 tending to maintain the roller 41 in engagement with the cam surfaces 40 of the disc 39, whilst the opposite end of the connecting rod 42 is pivotally mounted on a radially disposed arm 45 angularly displaceable about a shaft 46 forming the axis of rotation of the sandwich drum 11. The outer end of this arm 45 carries a curved plate 47 which is adapted to control the supply of sandwich biscuit from a hopper 48 through slots 55 in the drum 11.

Motion is conveyed from the driving shaft 12 to the drum 11 through worm 49 and worm wheel 50, whilst rotary motion of the shaft 12 is conveyed to the drum 10 through worm 51 and worm wheel 52.

Figure 8:
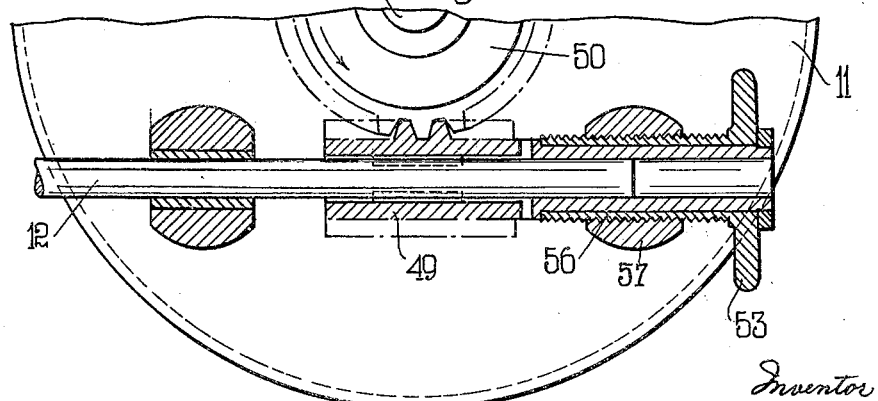
Figure 8 is a fragmentary view in section on the driving shaft, showing a means for adjusting the angular position of the drums with respect to one another.

It will be appereciated that it may be desired, at times, to adjust the relative position of the slots in the drum 11 with that of the pockets in the drum 10 in order to ensure that biscuits fed from the pockets 15 on the band 33 may be in the desired position beneath the stack 48 when a slot 55 of the drum 11 reaches the ejecting position for the sandwich biscuit. For this reason a hand screw wheel 53 having a threaded sleeve 56 engaged in a fixed support 57 loosely receives a projecting end of the worm 49 which is mounted by a sliding key (Fig. 8) on the shaft 12. As the hand wheel 53 is turned, this wheel and its sleeve are moved axially and therewith the worm is displaced in the line of the shaft 12, and thus carries with it the worm wheel 50 through a corresponding angle.

The operation of the machine is as follows:—

The relative angular positions of the drums 10 and 11 are adjusted whereupon these are then set in motion, the biscuits are fed from the hopper 14 into the pockets 15 of the stencil drum 10. The biscuits are conveyed into a circular path around the drum 10 and are held in position on the pockets by the flexible band 33 until they reach a position below the exit of the creaming hopper 21, whereupon cream is applied to the under surfaces of the biscuits through the stencil openings 20. The biscuits continue in their travel until they reach the ejecting device 32 whereupon they are forced out of engagement with the pockets 15 and pass with the endless flexible band 33 to a position below the sandwich hopper 48. As these biscuits reach the required position below the hopper, the curved plate 47 which is gradually moved to the left and maintains a biscuit from the hopper 48 in one of the slots in the drum 10, is caused to suddenly retreat due to the roller 41 of the connecting rod 42 suddenly dropping from one cam surface 40 of the disc 39 to the next succeeding cam surface. With this sudden retreat of the curved plate 47 a biscuit in a slot of the drum 11 drops on to the creamed biscuit immediately beneath it whereupon the finished biscuit then passes to a stacking or packing device (not shown).

It will be obvious that numerous modifications may be effected without departing from the scope of the invention. For example, a number of pockets 15 may be provided longitudinally of the drum so that more than one biscuit may be fed at any one time from the hopper 14.

Again, means may be provided to heat the hollow cylinder having the depressions provided with stencils at their base to prevent the icing or cream sticking therein.

Brushes 60 or the like means may be provided to act on the surface of the cylinder to keep the stencils clean.

I declare that what I claim is:—

1. Apparatus for applying a layer of plastic material such as cream, icing or the like to biscuits or the like, comprising a biscuit hopper, a shaft and means for driving the same, a hollow drum fixed on said shaft and having spaced pockets on its periphery and rotatably mounted opposite said hopper so that an individual biscuit may pass from said hopper into an individual pocket of the drum, said drum also having ports in its wall in alinement with the pockets and through which the material may pass onto the biscuit in the pockets, means within the drum for measuring the quantity of material on the biscuit, and means for holding the biscuit in said pockets during the application of the said material.

2. An apparatus as in claim 1 in which the pockets are of ratchet tooth form with their leading edges flush with the periphery of the drum.

3. Apparatus as in claim 1 in which the biscuit hopper is located above the said hollow drum and said hopper is inclined to the vertical.

4. Apparatus as in claim 1, including means for preventing the edge of a biscuit from catching on the edge of a port, and a device for removing said means prior to the delivery of said material through said port.

5. Apparatus as in claim 1, including a substantially radial arm located within the drum, an outer end piece movable along said arm, a spring to move said piece outwardly to engage the same in one of said ports, said arm and piece being carried in rotation with the drum when said piece is engaged in the port, a spring for returning said arm and piece to their initial position, and means operative upon a predetermined angular movement of the drum for disengaging said piece from said port whereby it may be returned by said spring into initial position for entering the next succeeding port.

6. Apparatus as in claim 1, in which the pockets are of ratchet tooth form with their leading edges gradually merging into the peripheral surface of the drum while the rear or opposite end of the pocket consists of a face extending substantially radially of the drum, the base of the pocket between said edge and face being substantially a plane.

7. Apparatus as in claim 1, including a stripping device for removing the biscuit with the material thereon from the pockets of the drum, said means comprising a substantially radial arm having a relatively movable head adapted to engage and eject the coated biscuit from a pocket and a spring to move said head outwardly, said holding means being free of the biscuit opposite said arm, and means for regulating the angular position of said arm about the axis of said drum.

8. Apparatus for applying a layer of plastic material such as cream, icing or the like to biscuits or the like, comprising a biscuit hopper, a hollow drum having spaced pockets on its periphery and rotatably mounted opposite said hopper so that individual biscuits may pass from said hopper into the individual pockets of the drum, said drum also having ports in its wall in alinement with the pockets and through which the material may pass onto the biscuit in the pocket, means within the drum for measuring the quantity of material on the biscuit, and a traveling flexible conveyer engaged with the periphery of the drum from a point adjacent said hopper to a point beyond said measuring means and serving for holding the biscuit in said pockets during the application of the said material.

9. An apparatus as in claim 8, including a second drum for delivering sandwich biscuit, said conveyer extending from the periphery of said first drum to the periphery of said second drum for conveying biscuit from said first drum to said second drum.

10. Apparatus for applying a layer of plastic material such as cream, icing or the like to biscuits or the like, comprising a biscuit hopper, a hollow drum having spaced pockets on its periphery and rotatably mounted opposite said hopper so that individual biscuits may pass from said hopper into the individual pockets of the drum, said drum also having ports in its wall in alinement with the pockets and through which the material may pass onto the biscuit in the pocket, a relatively fixed partition in said drum dividing the same into compartments, one compartment constituting a hopper space for the plastic material, said partition having one edge located closely adjacent the internal peripheral wall of the drum to form a measuring device for leaving a predetermined quantity of said material in each port as the drum rotates past said edge, and means for holding the biscuit in the pocket while the material is applied thereto.

11. An apparatus as in claim 10 in which said holding means comprises a traveling flexible conveyer engaged with the periphery of said drum from a point adjacent said hopper to a point beyond the edge of said partition.

12. An apparatus for applying a layer of plastic material such as cream, icing or the like to biscuits or the like, comprising a biscuit hopper, a first hollow drum located relatively beneath said hopper and having spaced pockets in its periphery each adapted to receive one biscuit from the hopper as the drum rotates therebeneath, said first drum having ports for establishing communication between the pockets to the interior of the drum, partition means in said first drum for providing a hopper therein for holding the material in position ready for passage through said ports, a second drum including means for individually delivering sandwich biscuit, a traveling flexible conveyer passing around a part of the periphery of said first drum and beneath said second drum whereby to hold the biscuit from said hopper in the pockets of said first drum and then to convey the biscuit from said first drum to said second drum, means for driving said drums at the same peripheral speed, said second drum and its biscuit delivering means including peripheral slots in said second drum for the passage of sandwich biscuits, a plate member for obstructing the slots, and means operated by the movement of said first drum for moving said plate member from its obstructing position.

13. Apparatus as in claim 12, in which said moving means consists of a cam rotating with said first drum, a cam controlled member cooperating said with cam for moving said plate member in one direction and a spring on said rod for moving the plate member in the opposite direction.

14. An apparatus for applying a layer of plastic material such as cream, icing or the like to biscuits or the like, comprising a biscuit hopper, a first hollow drum located relatively beneath said hopper and having spaced pockets in its periphery each adapted to receive one biscuit from the hopper as the drum rotates therebeneath, said first drum having ports for establishing communication between the pockets to the interior of the drum, partition means in said first drum for providing a hopper therein for holding the material in position ready for passage through said ports, a second drum including means for individually delivering sandwich biscuit, a traveling flexible conveyer passing around a part of the periphery of said first drum and beneath said second drum whereby to hold the biscuit from said hopper in the pockets of said first drum and then to convey the biscuit from said first drum to said second drum, means for driving said drums at the same peripheral speed, and means for varying the angular position of said second drum with respect to said first drum.

15. Apparatus for applying a layer of plastic material such as cream, icing or the like to biscuits or the like, comprising a biscuit hopper, a rigid hollow drum having spaced pockets on its periphery and ports in its wall in alignment with the pockets and through which the material may pass from the interior of the drum onto the biscuit in the pockets, means for rotating said drum about its axis, means within the drum for holding a supply of material ready for movement through the ports onto the individual biscuit during the rotation of the drum and including a device for measuring the quantity of material applied to the biscuit, and means for holding the biscuit in said pockets during the application of said material and the removal of the excess above the measured quantity.

In witness whereof, I have hereunto signed my name this 28th day of April, 1930.

HAROLD HARDMAN TUNSTALL.